United States Patent Office 2,746,774
Patented May 22, 1956

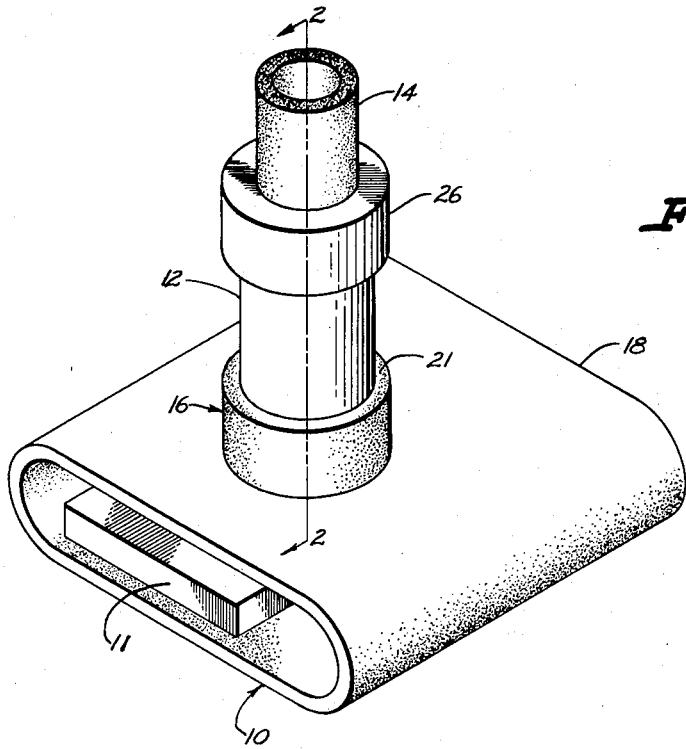
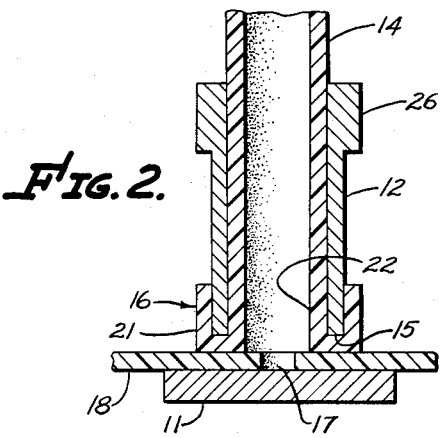
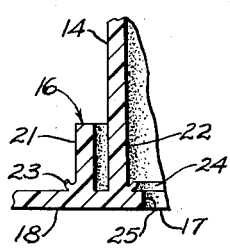

2,746,774

PLASTIC IRRIGATION TUBING OUTLET

Hans L. Nielsen, Bakersfield, Calif.

Application December 30, 1953, Serial No. 401,203

3 Claims. (Cl. 285—38)

The present invention relates to new and improved plastic irrigation tubing outlets and to a method for making the same.

Traditionally, irrigation water has been impounded in various reservoirs or has been taken from moving streams and transported by either large conduits or canals. From these large conduits or canals, the water is taken through successively smaller canals or conduits until the size of the stream within such canals or conduits is such that this stream can be used directly to irrigate ploughed furrows within a field. In the prior art, virtually all of the canals used to distribute water to such ploughed furrows have been mere open ditches from which the flow of water is controlled by the use of earth banks.

There have been numerous problems attendant to the use of such earth ditches, such as, for example, loss of water due to evaporation and soaking into the ground and the tendency of such ditches to become clogged after relatively brief periods with weed growth. Obviously, such growth takes a large portion of the water which is desired to be used commercially. In order to overcome these defects, it has previously been proposed to substitute for such comparatively small open ditches large conduits of flexible plastic material, such as, for example, conduits of 6″ to 8″ diameter formed of polyethylene, polyvinyl chloride, polyvinyl acetate, or the like, or combinations of these materials. Such flexible conduits have proved to be extremely advantageous. Because of their light weight, they may be handled with a minimum of difficulty by a worker, and may be spread so as to cover a large area in a short time. There is, however, one major difficulty attendant to such large conduits and this relates to the method of obtaining water for the individual ploughed furrows from them.

It is an object of the present invention to overcome this difficulty. A more specific object of the invention is to overcome this difficulty by developing an irrigation tubing outlet of plastic, which is attached to a plastic irrigation conduit, as previously indicated, and which can be provided with inexpensive, appropriate means for governing the flow of liquid from such a larger conduit. A further and related object of the invention is to develop a construction of the class described which is extremely strong and which can stand rough handling under adverse conditions without tearing. A related object is to develop a construction which utilizes a double-type seal surrounding an opening in a larger plastic irrigation conduit so as to attach a tubing outlet to such conduit.

Another and more detailed object of the invention is to teach a method of making such a double seal which can be easily and conveniently practiced. Further, it is another object of the invention to teach a method which involves the steps of placing an unattached outlet tubing around the end of a sleeve-like electrode and placing the so-covered end of this electrode against the wall of a plastic irrigation tubing conduit within which there is disposed a second electrode element; and sealing the conduit and the tubing outlet walls while forcing these electrodes towards one another with a controlled amount of pressure.

Further objects of the invention, as well as the advantages of it, will be more fully apparent from the balance of this specification, including the appended claims and the accompanying drawings, in which:

Fig. 1 shows a partially sectional isomeric view illustrating the manner in which the tubing outlets of the invention are formed;

Fig. 2 shows a partially cross-sectional view taken at line 2—2 of Fig. 1, illustrating the positions occupied by the various members employed prior to the actual sealing operation; and Fig. 3 is a cross-sectional view of the seal utilized in a tubing outlet of the present invention.

In Fig. 1 of the drawing, there is shown a plastic irrigation conduit 10 formed of such thermoplastic materials as polyethylene, plasticized polyvinyl chloride, acetate or butyrate compositions, or the like. Within this conduit, there is shown disposed a flat, bar-shaped sealing electrode 11, upon one side of which there is placed a hollow tubular electrode 12. Thermoplastic resin tubing 14 is passed through the electrode 12 and is reverted around the end 15 of this electrode 12 so as to present a double-walled end 16 as shown most clearly in Fig. 2 of the drawings. The electrode 12 in use is placed surrounding a hole 17 within a wall 18 of the conduit 10. This hole 17 preferably is of slightly smaller diameter than the inside diameter of the tubing 14 for a purpose which will be more fully explained later.

In forming the tubing outlet of the invention, the electrode 12 is positioned as shown in Fig. 2 of the drawing, and is urged against the wall 18 while simultaneously the electrodes 11 and 12 are connected to a suitable conventional current source for dielectric heating (not shown), by means of appropriate conventional terminals (also not shown). After current has been maintained for a period, the length of which depends upon the thickness of the wall 18 and the tubing 14, it is shut off and the electrodes 11 and 12 are removed from the conduit 10 and the tubing 14.

As a result of this operation, a seal is obtained such as is shown in Fig. 3 of the drawing, in which the walls 21 and 22 of the end 16 of the tube 14 are fused at their lower extremities to the wall 18 forming separate upstanding tubes so that in between these walls 21 and 22 the thickness of the wall 18 is substantially the same thickness as the original wall 18. The amount of pressure required between the electrodes 11 and 12 during the sealing in order to obtain this thickness can be readily determined by those skilled in the art with a minimum of experimentation. This amount will vary in the expected manner with the resin or resins employed, the amount of heat generated, the thicknesses of the respective resin walls, and the heating times.

During this fusion, small beads 23 and 24 form as shown in Fig. 3 of the drawing, by virtue of the resin flowing from between the electrodes 11 and 12. These beads are believed to add strength to the seal formed in accordance with the teachings of this disclosure. Because the opening 17 is of slightly smaller diameter than the internal diameter of the tubing 14, a small flange 25 positioned internally of the wall 22 is obtained. This flange helps in forming a stiff, tight junction between the tubing 14 and the conduit 10. The flange 25 is also desirable because with such a flange present, there is not a great deal of danger of forming an imperfect seal due to the electrode 12 being slightly out of alignment with the hole 17.

Constructions as illustrated in the drawings are particularly satisfactory inasmuch as the tubular outlets formed are relatively rigid as attached to a plastic conduit and cannot be easily distorted or deformed. The tubing outlets formed in this manner are flexible in nature and may be equipped with various clamping devices such as clips serving as valves, as desired. Such clamping devices are generally of comparatively small size, are light weight, and are relatively cheap, yet effective.

When the tubular outlets of the invention become damaged due to abnormal handling or other factors, it is frequently possible to reform these outlets with a minimum of difficulty around the original opening 17 within the conduit 10, by merely placing the tubing 14 around an enlarged extremity 26 of the electrode 12 in the same manner in which this tubing is placed initially around the end 15, and repeating the sealing operation with the conduit in this location.

Those skilled in the art will be able to make numerous modifications within the scope of the present invention with a minimum of difficulty. Such modifications are to be considered as part of the inventive concept insofar as they are defined by the appended claims.

I claim as my invention:

1. Irrigation apparatus comprising an elongated tubular conduit formed of a flexible thermoplastic material and having at least one opening extending transversely through the side wall thereof, said opening having a diameter substantially less than the internal diameter of said conduit, and an elongated tubular outlet member formed of a flexible thermoplastic material, said tubular outlet member having an inside diameter greater than the diameter of said opening, said outlet member having a reversed end to form a flange disposed in spaced concentric relation with respect to the adjacent confronting portion of said outlet member, said outlet member and said flange each having finite axial lengths with the finite length of said outlet member being greater than that of said flange, said reversed end of said outlet member being disposed in concentric relation with respect to said opening and fused to said conduit to integrally unite said outlet member and said flange with said conduit, and the wall thickness of the fused outlet member and conduit at their point of juncture being no greater than the sum of the individual thicknesses of the outlet member and said conduit.

2. Irrigation apparatus as defined in claim 1 wherein said conduit and said tubular outlet member are formed of the same thermoplastic material.

3. Irrigation apparatus as defined in claim 1 and a circumferential reinforcing bead disposed at the external line of junction between said flange and said conduit, and a second circumferential reinforcing bead disposed interiorly of said first tubular outlet member at the line of junction formed by the intersection of the inner diameter of said first tubular outlet member and said conduit.

References Cited in the file of this patent
UNITED STATES PATENTS

| | | |
|---|---|---|
| 1,352,383 | Riley | Sept. 7, 1920 |
| 1,861,466 | Bafetti | June 7, 1932 |
| 1,933,711 | Cornell, Jr. | Nov. 7, 1933 |
| 2,057,195 | Keefe | Oct. 13, 1936 |
| 2,482,368 | Reichenbach | Sept. 20, 1949 |
| 2,681,296 | Dobbs et al. | June 15, 1954 |